N. C. LOCKE.

STEAM AND WATER PRESSURE REGULATOR.

No. 7,108. Reissued May 16, 1876.

WITNESSES

A. H. Norris.

J. S. Brooks

INVENTOR.

N. C. Locke

Per Brown Bros

Attorneys.

N. PETERS, PHOTO-LITHOGRAPHER, WASHINGTON, D. C.

UNITED STATES PATENT OFFICE.

NATHANIEL C. LOCKE, OF SALEM, MASSACHUSETTS.

IMPROVEMENT IN STEAM AND WATER PRESSURE REGULATORS.

Specification forming part of Letters Patent No. 113,069, dated March 28, 1871; reissue No. 7,108, dated May 16, 1876; application filed January 25, 1876.

*To all whom it may concern:*

Be it known that I, NATHANIEL C. LOCKE, of Salem, in the county of Essex and State of Massachusetts, have invented Improvements in Steam and Water Pressure Regulators, of which the following is a specification:

This invention, while applicable to pressure-regulators, irrespective of the nature of the fluid which may pass through them, is mainly designed to be used for regulating the supply at a reduced and uniform pressure of steam and water, but more particularly the latter, as in the case of water supplied from street-mains to the interior of buildings for various purposes, and in which it is an object to keep the pressure of said supply lower than it is in the main.

The invention consists, essentially, in the combination, in a pressure-regulator constructed to be connected with a street-main or other supply-pipe, and having a receiving-chamber and a supply-valve, of a relief-valve constructed and arranged to prevent any excess of pressure in the receiving-chamber, as hereinafter described.

The invention also consists in a yielding connection between the supply-valve and the diaphragm or piston in the receiving-chamber, whereby after the supply-valve is closed the diaphragm or piston can have a further upward movement, and thus operate upon a safety or relief valve; and, furthermore, this invention consists of a prolongation or extension of the valve-stem of the supply-valve beyond its seat portion, which prolongation is of suitable form and size to closely fit within, and to continuously surround and close, the opening through the valve-seat, and is of such a length that when it is drawn entirely out of the valve-opening to open said opening to the passage of the fluid, its seat portion will be then situated without and beyond the direct course or flow of fluid through the valve-opening, thereby securing such seat against injury by the flow of the fluid through the valve.

The invention also embodies other features, which will be fully described and specifically pointed out in the claims.

Figure 1:
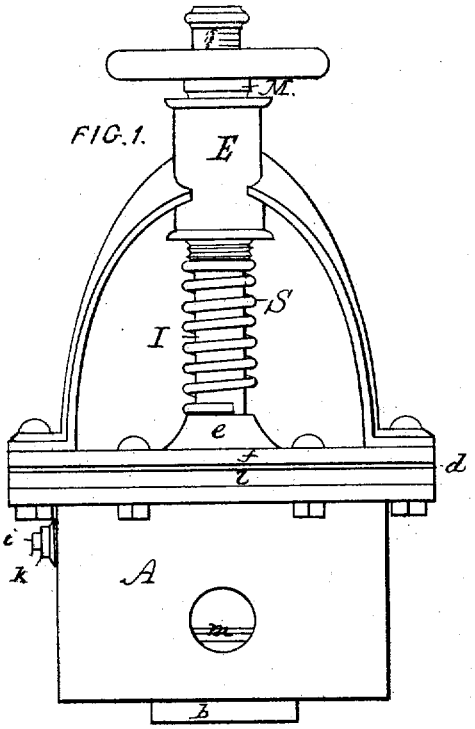
Figure 2:
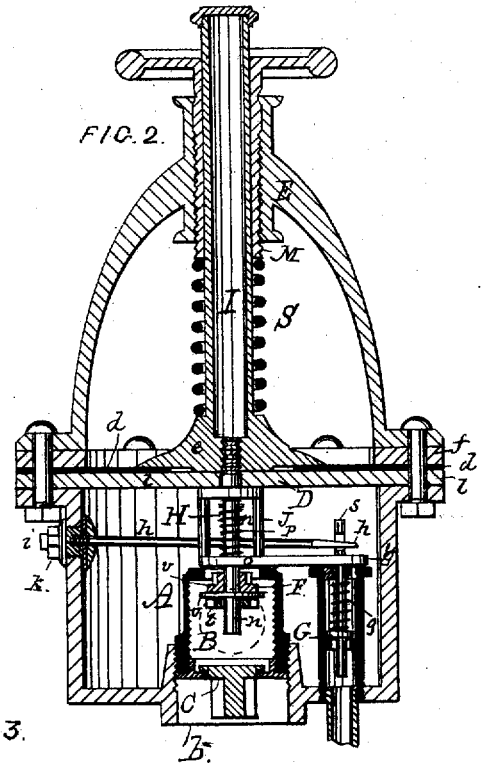
Figure 3:
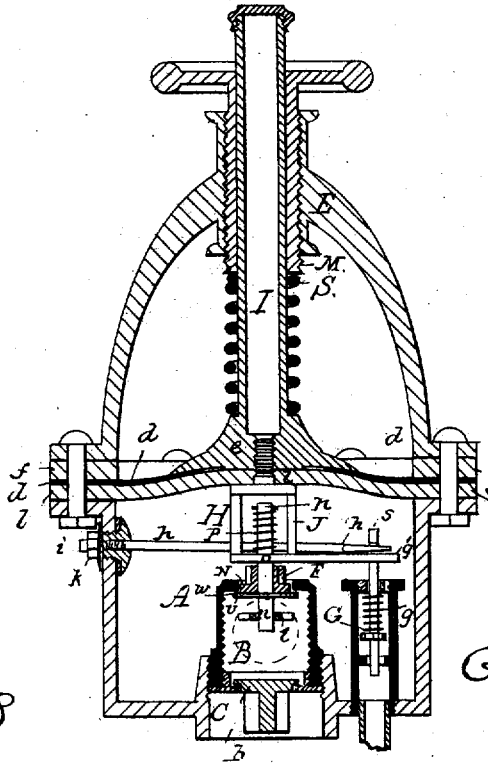
Figure 4:
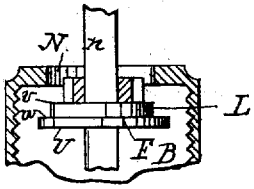
Figure 5:
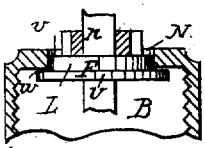

In the accompanying plate of drawings, Figure 1 represents an elevation of a pressure-regulator constructed in accordance with my invention; Figs. 2 and 3, vertical sections of the same, with certain of the valves and working parts in different positions; Figs. 4 and 5, enlarged views of the supply-valve and its seat when opened and closed, respectively.

A represents the receiver of a water-pressure regulator, designed to be connected with a street-main or other supply-pipe, and to which *b* is the inlet. Said inlet *b* communicates with a valve-box, B, which is fitted with a check-valve, C, to prevent return of water to the main or other supply-pipe, and possible collapse of the pipes and their attachments in the building when flooding or drawing off the water from the main or other supply-pipe, which device has been made the subject of a previous application for patent by me. The valve-box B is also provided above the check-valve C with a supply-valve, F, opening downward or against the current through the valve-box B, and which is opened by the downward movement of the loaded piston or diaphragm D, and closed by the excess of pressure against the under side of said supply-valve F, according as the pressure of the water is diminished or increased on the diaphragm. The diaphragm D it is preferred to construct in part of a sheet or disk of rubber, or other like material, and in part of metal *d*, which latter is applied as a covering to the rubber to protect it from injury, and to seal the rubber against leakage, said sheet metal working in common with the rubber, and being clamped internally, or at its center, by a base-piece, *e*, on a rising and falling stem, I, and externally by a ring, which establishes the joint of the diaphragm with the receiver.

S is the spring by which the diaphragm D is loaded to the required pressure. Said spring is coiled around the stem I and acts upon the diaphragm D to keep it down by its arrangement between the base-piece *e* and adjusting nut or box M, which fits by a screw-thread, on its exterior, through frame E, made fast to the receiver. The stem I is fitted to slide up and down through this adjusting-box M, and is graduated or marked with figures denoting different pressures, as seen in Fig. 1, so that by turning the box M to the right or left the spring S is more or less compressed and made to act with a force on the diaphragm D corresponding to the indicating-marks on the stem, as either one of them is brought in line with the upper surface of the box, or with a pointer thereon.

Such devices form a simple means for varying the action of the pressure-regulator to shut off the supply to it at any desired or given pressure.

H is the yielding connection between supply-valve F and the diaphragm or piston D. A yoke, J, is screwed to the lower end of the stem I, which also confines the diaphragm thereto, as shown. A stem, *n*, of supply-valve F passes up through a hole in the bottom portion *o* of yoke J, and is free to move therein. The valve F, by its stem *n*, is held in close connection to the diaphragm or piston D for a quick opening of the valve, when the diaphragm moves downward, by a spring, *p*, as well as by the pressure under the valve F in the valve-box B, so far as in the upward movement of the diaphragm or piston, as the closing or seating of the valve will allow, when, by reason of the yielding connection H, the diaphragm or piston can still rise, if the pressure continues or increases in the receiver. The safety or relief-valve G is kept closed by a spring, *g*, and is opened by the upward movement of the yoke J through an extension, *g'*, of said yoke, lifting an elastic wedge, *h*, fitting through a slot in the stem *s* of the safety-valve, and adjustable from the exterior of the receiver by a screw-box, *i*, on which may be screwed a locking-nut, *k*, the turning of the screw-box *i* when the locking-nut *k* is slackened, serving to project the elastic wedge *h* more or less through the slot in the stem *s* of the valve G, whereby the timely action of said valve, relatively to the diaphragm, to give speedier or tardier relief, may be varied. By thus providing for the adjustment of the safety-valve from the outside of the receiver, the breaking of the diaphragm-joint to effect adjustment of the valve is avoided.

Heretofore the connection in pressure-regulators, between the diaphragm or piston and supply-valve, has been rigid, preventing any independent movement of either the diaphragm or supply-valve without a corresponding movement of the other, while, with a yielding connection, substantially as described, the diaphragm or piston, if there is any increase of pressure upon it, caused by leakage or expansion of the water, after the supply-valve has closed, can continue to rise, and thus allow it (the diaphragm or piston) to act upon and open the relief-valve G, thereby equalizing the pressure in the receiver.

The receiver A may have any number of outlets, *m*, by which the fluid, under a uniform pressure, is taken or supplied to the pipes. Although the spring *p*, on stem *n*, serves to keep the supply-valve F up to the diaphragm, so far as the limited upward movement of the supply-valve will allow it, it can be dispensed with, for the upward pressure against the under part of the supply-valve will always be sufficient to force the valve up and to its seat, so far as the diaphragm in its movement will admit.

A bar, *t*, in the valve-box B prevents, in case the spring *p* is not used, the falling of the valve F beyond a proper position for operation.

Great advantages in operating a safety or relief valve by a diaphragm or piston are obtained, among which may be mentioned the increased power by reason of the larger surface of the diaphragm or piston; also, the pressure operating the diaphragm or piston, and through it the safety or relief valve, being independent of the pressure under the safety or relief valve, which heretofore has operated the same; and to the insuring of a full opening of the safety or relief valve, so as to quickly, freely, and effectually relieve the pressure in the receiver.

L is an extension or prolongation of the valve F. This extension L is from the disk U of valve F, and it is made of a form and of a shape to nicely and closely fit within and to continuously surround and close the periphery of the valve-opening, so that before the fluid in the receiver can pass through the valve-opening, the full length of the prolongation must be drawn out of, and its end *v* made to clear, the valve-opening N, and obviously if this extension or prolongation L be either long or short, the seat portion *w* of the valve F will be carried correspondingly a greater or lesser distance away from the valve-opening, thereby proportionately removing it from the direct line of flow or course of the fluid through the valve-opening, and securing protection to it against being injured by cutting or wearing away of the valve-seat by the fluid which passes through the valve-opening.

The prolongation L of the valve F also subserves the purpose of preventing a constant humming or buzzing noise. Without such extension to the valve, entirely filling the valve-opening, the least leak in the faucets in the house beyond the regulator would cause a slight motion of the valve upon its seat, by reason of the two opposing forces acting upon the valve, and hence the noise referred to; but by reason of the extension no water could pass until the two forces of the valve were removed sufficiently to allow of the withdrawal of the said extension; but if the extension permitted the least water to pass it before being drawn out, it would not answer the purpose for which it is intended.

Obviously this part of the invention is particularly applicable to and important for valves for the use of steam alone.

I am aware of the English Patent No. 1,787, of 1866, in which a valve is provided with an extension fitting within a disk of leather or other flexible and light material, which forms the valve-seat, to prevent concussion. Such would not be practicable for the purpose intended by me, for the reason that it would be impossible to maintain a tight joint between the leather and the extension of the valve, and moreover, the leather would be soon cut away if steam were used; moreover, the said English patent has for its object to prevent concussion, and this could not be accomplished if his extension closely fitted within and entirely filled the valve opening, inasmuch as it would cut off the flow of water too suddenly.

Having now described my invention, what I claim, and desire to secure by Letters Patent, is—

1. The combination, in a pressure-regulator, constructed to be connected with a street-main or other supply-pipe, and having a receiving-chamber, A, and a supply-valve, of a relief-valve for preventing any excess of pressure in the receiving-chamber, substantially as described.

2. The yielding connection between the supply-valve F and the diaphragm or piston D, whereby after the supply-valve is closed the diaphragm or piston can have a further upward movement, and thus operate upon a safety or relief valve, substantially as described.

3. The combination in a pressure-regulator, constructed with a receiving-chamber A, a flexible diaphragm D, and a check-valve, C, of a relief-valve, G, arranged in said receiving-chamber, and connected with the flexible diaphragm, substantially as and for the purpose described.

4. The combination of the diaphragm or piston D, supply-valve F, safety or relief valve G, substantially as and for the purpose specified.

5. The valve-box or body B, formed with the metallic valve-seat, having a cylindrical opening, N, into which the projection on the valve closes, in combination with the valve F, having the disk U formed with the metallic prolongation or extension L, closely fitting within and entirely filling the opening of the metallic valve-seat, as and for the object specified.

NATHANIEL C. LOCKE.

Witnesses:
CHAS. W. PALFRAY,
WM. G. TAYTE.